United States Patent
Willmott et al.

(10) Patent No.: US 12,026,621 B2
(45) Date of Patent: Jul. 2, 2024

(54) METHOD AND SYSTEM FOR LOW-QUERY BLACK-BOX UNIVERSAL ATTACKS

(71) Applicant: Robert Bosch GmbH, Stuttgart (DE)

(72) Inventors: Devin T. Willmott, Pittsburgh, PA (US); Anit Kumar Sahu, Pittsburgh, PA (US); Fatemeh Sheikholeslami, Pittsburgh, PA (US); Filipe J. Cabrita Condessa, Pittsburgh, PA (US); Jeremy Kolter, Pittsburgh, PA (US)

(73) Assignee: Robert Bosch GmbH (DE)

( * ) Notice: Subject to any disclaimer, the term of this patent is extended or adjusted under 35 U.S.C. 154(b) by 861 days.

(21) Appl. No.: 17/107,415

(22) Filed: Nov. 30, 2020

(65) Prior Publication Data
US 2022/0172061 A1    Jun. 2, 2022

(51) Int. Cl.
| | |
|---|---|
| *G06N 3/084* | (2023.01) |
| *G06F 16/9035* | (2019.01) |
| *G06F 18/214* | (2023.01) |
| *G06F 18/24* | (2023.01) |
| *G06V 10/75* | (2022.01) |

(52) U.S. Cl.
CPC .......... *G06N 3/084* (2013.01); *G06F 16/9035* (2019.01); *G06F 18/214* (2023.01); *G06F 18/24* (2023.01); *G06V 10/751* (2022.01)

(58) Field of Classification Search
CPC ....................................................... G06N 3/084
USPC ........................................................... 706/25
See application file for complete search history.

(56) References Cited

U.S. PATENT DOCUMENTS

| | | | | |
|---|---|---|---|---|
| 10,783,401 | B1* | 9/2020 | Jiang | G06N 3/086 |
| 11,500,671 | B2* | 11/2022 | Duesterwald | G06F 18/214 |
| 11,776,241 | B1* | 10/2023 | Jiang | G06V 10/82 |
| | | | | 382/156 |
| 2019/0370683 | A1* | 12/2019 | Metzen | G06N 20/00 |
| 2020/0311481 | A1* | 10/2020 | Tong | G06V 10/774 |
| 2021/0089866 | A1* | 3/2021 | Kolter | G06N 3/08 |
| 2021/0089879 | A1* | 3/2021 | Shukla | G06T 3/40 |

(Continued)

OTHER PUBLICATIONS

Goodfellow I., Mcdaniel P., Papernot N.: Making machine learning robust against adversarial inputs. Communications of the ACM 61, 7 (Jun. 2018), 56-66. doi:10.1145/3134599 (Year: 2018).*

(Continued)

*Primary Examiner* — Reza Nabi
(74) *Attorney, Agent, or Firm* — Dickinson Wright PLLC (57) ABSTRACT

A computer-implemented method for training a machine-learning network, wherein the network includes receiving an input data from a sensor, wherein the input data includes data indicative of an image, wherein the sensor includes a video, radar, LiDAR, sound, sonar, ultrasonic, motion, or thermal imaging sensor, generating an adversarial version of the input data utilizing an optimizer, wherein the adversarial version of the input data utilizes a subset of the input data, parameters associated with the optimizer, and one or more perturbation tiles, determining loss function value in response to the adversarial version of the input data and a classification of the adversarial version of the input data, determining a perturbation tile in response the loss function value associated with one or more subsets of the adversarial version of the input data, and output a perturbation that includes at least the perturbation tile.

20 Claims, 9 Drawing Sheets

(56) References Cited

U.S. PATENT DOCUMENTS

| | | | |
|---|---|---|---|
| 2021/0125107 A1* | 4/2021 | Condessa | G06F 18/241 |
| 2021/0182394 A1* | 6/2021 | Condessa | G06N 3/044 |
| 2022/0067521 A1* | 3/2022 | Chen | G06V 10/774 |
| 2022/0108132 A1* | 4/2022 | Zhang | G06F 18/2148 |
| 2022/0126864 A1* | 4/2022 | Moustafa | B60W 30/182 |
| 2022/0172061 A1* | 6/2022 | Willmott | G06V 10/774 |
| 2022/0343026 A1* | 10/2022 | Yang | G06T 1/0092 |
| 2022/0405537 A1* | 12/2022 | Yang | G06F 18/256 |
| 2022/0405648 A1* | 12/2022 | Lin | G06N 3/094 |
| 2023/0096021 A1* | 3/2023 | Trockman | G06N 3/084 382/156 |
| 2023/0100132 A1* | 3/2023 | Rice | G06N 3/084 706/15 |
| 2023/0100765 A1* | 3/2023 | Roderick | G06V 10/82 706/15 |
| 2023/0101812 A1* | 3/2023 | Feng | G06N 3/08 706/15 |
| 2023/0107463 A1* | 4/2023 | Baharloui | G06N 3/08 706/20 |
| 2023/0109964 A1* | 4/2023 | Wang | G06N 3/09 706/15 |
| 2023/0186429 A1* | 6/2023 | Norouzzadeh | G06T 9/002 |
| 2023/0297823 A1* | 9/2023 | Wang | G06N 3/047 706/25 |
| 2023/0298315 A1* | 9/2023 | Sheikholeslami | G06T 5/70 707/737 |
| 2023/0331254 A1* | 10/2023 | Kapoor | G06N 3/08 |

OTHER PUBLICATIONS

Moosavi-Dezfooli et al., "Universal adversarial perturbations", Mar. 9, 2017, arXiv:1610.08401v3, 11 pages.

Chaubey et al., "Universal Adversarial Perturbations: A Survey", Vision and Language Group Indian Institute of Technology, Roorkee, May 16, 2020, arXiv:2005.08087v1, 20 pages.

Andriushchenko et al., "Square Attack: a query-efficient black-box adversarial attack via random search", Jul. 29, 2020, arXiv:1912.00049v3, 34 pages.

Meunier et al., "Yet Another but More Efficient Black-Box Adversarial Attack: Tiling and Evolution Strategies", Universit Paris-Dauphine, PSL Research University, CNRS, Lamsade, Paris, France, Nov. 21, 2019, arXiv:1910.02244v2, 18 pages.

* cited by examiner

ORIGINAL TILE, 3x5x5

FIG. 4A

REPEATED TILE, 3x18x18

METHOD AND SYSTEM FOR LOW-QUERY BLACK-BOX UNIVERSAL ATTACKS

TECHNICAL FIELD

The present disclosure relates to machine learning, including machine learning against adversarial attacks.

BACKGROUND

Neural networks, including deep networks, may be sensitive to adversarial attacks. Such adversarial attacks may be small changes in the input to classifiers that can drastically change output. While such attacks can be in a "white box" setting (e.g., assuming full knowledge of the classifier, including the ability to backpropagate through it), these attacks can also transfer to the "black-box" setting where one has to query access to the classifier.

SUMMARY

According to one embodiment, a computer-implemented method for training a machine-learning network, wherein the network includes receiving an input data from a sensor, wherein the input data includes data indicative of an image, wherein the sensor includes a video, radar, LiDAR, sound, sonar, ultrasonic, motion, or thermal imaging sensor, generating an adversarial version of the input data utilizing an optimizer, wherein the adversarial version of the input data utilizes a subset of the input data, parameters associated with the optimizer, and one or more perturbation tiles, determining loss function value utilizing the adversarial version of the input data and a classification of the adversarial version of the input data, determining a perturbation tile utilizing the loss function value associated with one or more subsets of the adversarial version of the input data, and output a perturbation that includes at least the perturbation tile.

According to a second embodiment, a system including a machine-learning network includes an input interface configured to receive input data from a sensor, wherein the sensor includes a video, radar, LiDAR, sound, sonar, ultrasonic, motion, or thermal imaging sensor. The system includes a processor in communication with the input interface. The processor is programmed to receive an input data from a sensor, wherein the input data includes one or more images, generating a perturbation tile utilizing parameters from an optimizer, generating an adversarial version of one of the one or more images utilizing the perturbation tile and one or more images, determining a loss function value in response to the adversarial version and a classification of the adversarial version, determining a perturbation in response the loss function value associated with one or more subsets of the adversarial version of the input data, and output the perturbation.

According to a third embodiment, a computer-program product storing instructions which, when executed by a computer, cause the computer to receive an input data from a sensor, wherein the input data includes data indicative of image, wherein the sensor includes a video, radar, LiDAR, sound, sonar, ultrasonic, motion, or thermal imaging sensor, generate a first adversarial version of a first subset of images from the input data utilizing an optimizer, wherein the first adversarial version of the first subset utilizes parameters associated with the optimizer, and one or more perturbation tiles, determine a loss function value in response to the first adversarial version of the first subset and a first classification of the first adversarial version of the first subset, determine a first perturbation tile in response the loss function value associated with of the first adversarial version of the first subset, output a perturbation that includes at least the first perturbation tile, generate a second adversarial version of a second subset of images from the input data utilizing an optimizer and the perturbation, determine the loss function value in response to the second adversarial version of the second subset and a second classification of the second adversarial version of the second subset, determine a second perturbation tile in response the loss function value associated with the second adversarial version of the second subset, and output a final perturbation in response to at least meeting or exceeding a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In particular, the disclosure below is a system and a method for generating perturbations that can be added to images to hard the performance of the target network. The system may utilize these perturbations at any point, such as training a network to be robust to these perturbations, testing or verifying network performance with respect to these perturbations, etc.

The following disclosure may be applied to many different domains. In the embodiments described, x (input) may be an image and C was an image classifier. However, this disclosure could be used to attack classifiers in other domains, such as audio, LIDAR, etc. As such, the system may include modifications that would be replacing the tiling technique of dimension reduction, which may be specific to the domain of images, with another domain-appropriate dimension reduction technique (or removing the dimension reduction entirely, if the input space in the new domain is low-dimensional).

Figure 1:
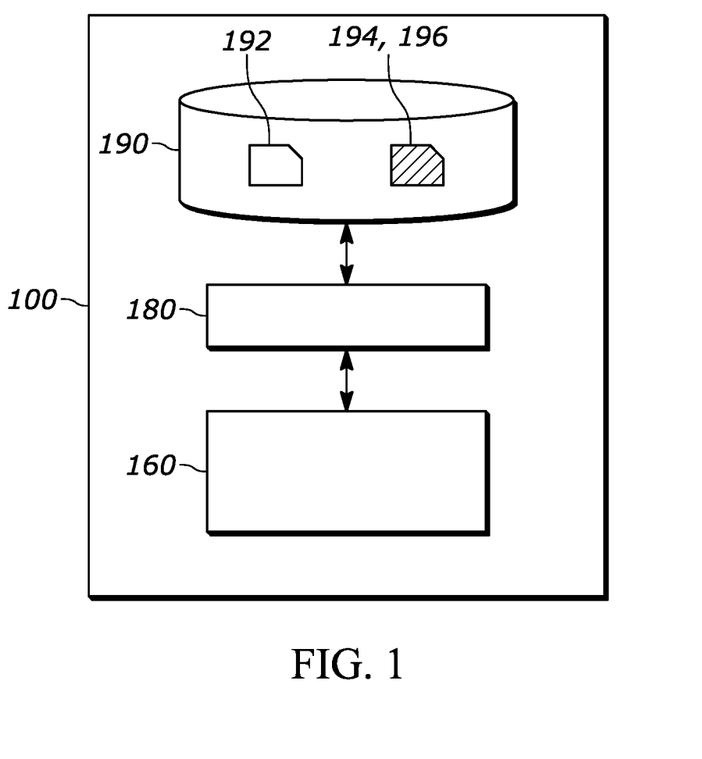
FIG. 1 shows a system 100 for training a neural network.

FIG. 1 shows a system 100 for training a neural network. The system 100 may comprise an input interface for accessing training data 192 for the neural network. For example, as illustrated in FIG. 1, the input interface may be constituted by a data storage interface 180 which may access the training data 192 from a data storage 190. For example, the data storage interface 180 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 190 may be an internal data storage of the system 100, such as a hard drive or SSD, but also an external data storage, e.g., a network-accessible data storage.

In some embodiments, the data storage 190 may further comprise a data representation 194 of an untrained version of the neural network which may be accessed by the system 100 from the data storage 190. It will be appreciated, however, that the training data 192 and the data representation 194 of the untrained neural network may also each be accessed from a different data storage, e.g., via a different subsystem of the data storage interface 180. Each subsystem may be of a type as is described above for the data storage interface 180. In other embodiments, the data representation 194 of the untrained neural network may be internally generated by the system 100 on the basis of design parameters for the neural network, and therefore may not explicitly be stored on the data storage 190. The system 100 may further comprise a processor subsystem 160 which may be configured to, during operation of the system 100, provide an iterative function as a substitute for a stack of layers of the neural network to be trained. In one embodiment, respective layers of the stack of layers being substituted may have mutually shared weights and may receive, as input, an output of a previous layer, or for a first layer of the stack of layers, an initial activation, and a part of the input of the stack of layers. The system may also include multiple layers. The processor subsystem 160 may be further configured to iteratively train the neural network using the training data 192. Here, an iteration of the training by the processor subsystem 160 may comprise a forward propagation part and a backward propagation part. The processor subsystem 160 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 196 of the trained neural network, this data may also be referred to as trained model data 196. For example, as also illustrated in FIG. 1, the output interface may be constituted by the data storage interface 180, with said interface being in these embodiments an input/output ("IO") interface, via which the trained model data 196 may be stored in the data storage 190. For example, the data representation 194 defining the 'untrained' neural network may during or after the training be replaced, at least in part by the data representation 196 of the trained neural network, in that the parameters of the neural network, such as weights, hyperparameters and other types of parameters of neural networks, may be adapted to reflect the training on the training data 192. This is also illustrated in FIG. 1 by the reference numerals 194, 196 referring to the same data record on the data storage 190. In other embodiments, the data representation 196 may be stored separately from the data representation 194 defining the 'untrained' neural network. In some embodiments, the output interface may be separate from the data storage interface 180 but may in general be of a type as described above for the data storage interface 180.

The system may train the neural network utilizing any known method. The method may correspond to an operation of the system 100 of FIG. 1, but does not need to, in that it may also correspond to an operation of another type of system, apparatus or device or in that it may correspond to a computer program. The method may provide a neural network, wherein the providing of the neural network comprises providing an iterative function as a substitute for a stack of layers of the neural network, wherein respective layers of the stack of layers being substituted have mutually shared weights and receive as input to an output of a previous layer, or for a first layer of the stack of layers, an initial activation, and a part of the input of the stack of layers. The method may access training data for the neural network. The method may contain a step to iteratively train the neural network using the training data, which training may comprise a forward propagation part and a backward propagation part. The method may further comprise, after the training, to output a trained neural network.

Figure 2:
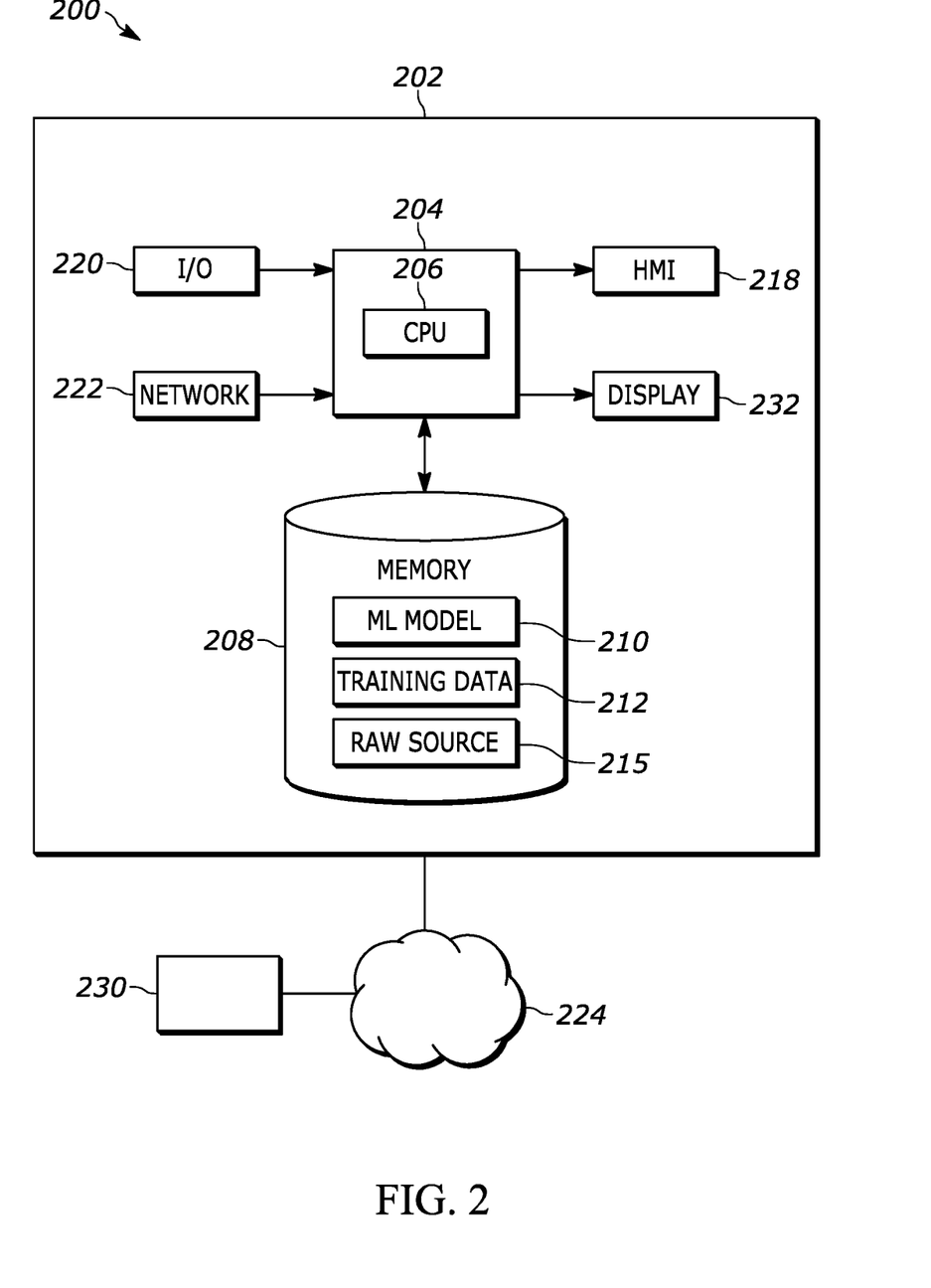
FIG. 2 depicts a data annotation system 300 to implement a system for annotating data.

FIG. 2 depicts a data annotation system 200 to implement a system for annotating data. The data annotation system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 220 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 322. The computing system 202 may include hardware and software for outputting graphics and text information to the display device 322. The display device 322 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 215. The raw source dataset 215 may include raw or unprocessed sensor data that may be representative of an input dataset for a machine-learning system. The raw source dataset 215 may include video, video segments, images, text-based information, and raw or partially processed sensor data (e.g., radar map of objects). In some examples, the machine-learning algorithm 210 may be a neural network algorithm that is designed to perform a predetermined function. For example, the neural network algorithm may be configured in automotive applications to identify pedestrians in video images.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include source videos with and without pedestrians and corresponding presence and location information. The source videos may include various scenarios in which pedestrians are identified.

The machine-learning algorithm 210 or machine-learning model 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in video images and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw video images from a camera.

In the example, the machine-learning algorithm 210 may process raw source data 215 and output an indication of a representation of an image. The output may also include augmented representation of the image. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
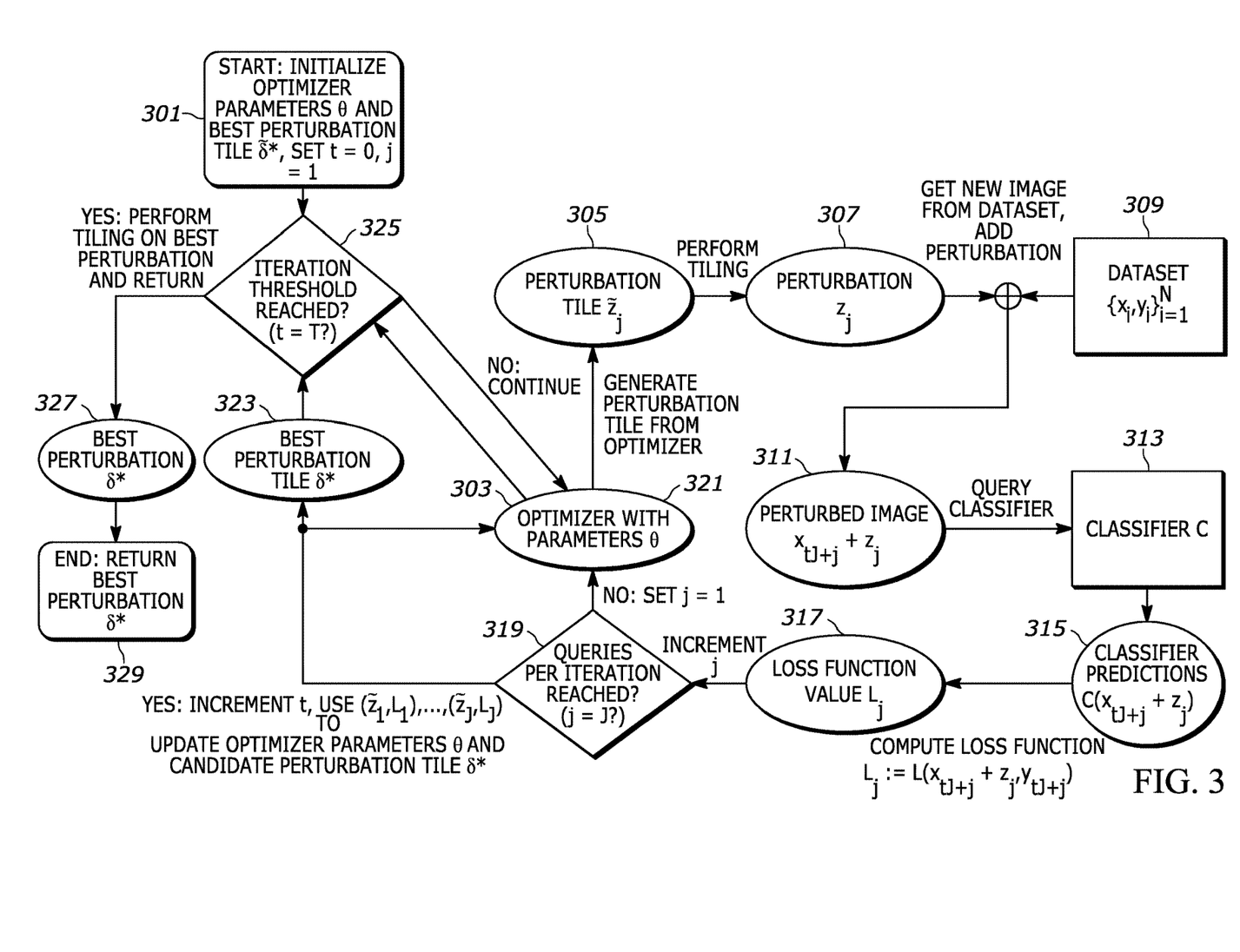
FIG. 3 illustrates a flow chart for a system that includes a process to identify an optimal perturbation for a given input.

FIG. 3 discloses a process to identify an optimal perturbation for a given input. Almost all adversarial attacks frame the search for an adversarial perturbation as an optimization problem where the system may minimize some loss function L(x, y) that takes an image x, finds the output of the classifier C(x), and compares this classifier output to the image's true label y. In the non-universal case (that is, the case where the system may consider only a single input-output pair (x, y)), this may be represented as:

$$\delta^*:=\text{argmax}_{\|\delta\|\leq\varepsilon}L(x+\delta, y)$$

The system may be looking for the perturbation $\delta^*$ that, when added to x, maximizes the difference between the classifier output $C(x+\delta)$ and the true label y. The constraint $\|\delta\|\leq\varepsilon$ denotes that the system may be searching only among perturbations that are restricted to being small in some norm; generally this is the 2-norm or $\infty$-norm, but any norm may be used.

For the disclosure of the embodiment shown below, the system may be looking for a universal perturbation. Thus, the system may not consider the loss when adding each perturbation $\delta$ to a particular input x, but rather consider the expected value of the loss when adding the perturbation $\delta$ to any image in the input distribution $\mathcal{P}(X)$. The system may therefore include the expectation over $\mathcal{P}(X)$ to get the following optimization problem, which is solved to find a universal adversarial perturbation.

$$\delta^*:=\text{argmax}_{\|\delta\|\leq\varepsilon}E_{x,y\sim\mathcal{P}(X)}[L(x+\delta,y)]$$

Past systems that are utilized in finding adversarial universal perturbations uses first-order methods, usually some variant of gradient descent, to solve the above optimization problem. Since first-order methods by definition may require gradient access, the system described below may not use them, and instead the system may use black-box optimization methods to solve it.

For context, black-box optimizers may be described herein. In one embodiment, a black-box optimizer may utilize internal parameters $\theta$ that it uses to keep track of the best solution based on the iteration, and where to search next. For example, the $\theta$ could be a momentum term used to move in directions of improvement. At each iteration, the optimizer may produce a set of candidate perturbations, evaluate each of them, and then update its parameters and its solution to the optimization problem.

Many popular black-box optimizers work as described above. One embodiment may include Covariance Matrix Adaptation Evolution Strategy (CMA-ES). For example, the CMA-ES may keep track of a set of parameters $\theta$ that includes a mean $\mu$ and variance $\Sigma$ of a normal distribution, that is, $\theta=\{\mu, \Sigma\}$. At each iteration, the CMA-ES algorithm may generate a set of population of candidate solutions from the normal distribution $\mathcal{N}(\mu, \Sigma)$ and evaluates each one. After evaluating each solution, it updates its parameters and its proposed solution to the optimization problem: the parameters are updated to move the distribution $\mathcal{N}(\mu, \Sigma)$ toward better solutions and away from worse ones, and the proposed solution is the one with the best evaluation.

The CMA-ES optimizer may be utilized in one embodiment. However, any optimizer may be utilized, especially one that works similar to those optimizers described above.

For context, tiled perturbations may be described herein. In general, the performance of black-box optimization algorithms may suffer as the dimension of the problem increases. In the case of image classification in particular, a three channel image with a side length of $\ell$ (and any perturbations we add to it) will be in the space $\mathbb{R}^{3\times\ell\times\ell}$ (one dimension for each pixel). For even modestly sized $\ell$, any black-box optimization technique may struggle greatly or fail completely to find a solution. To overcome this issue, most black-box adversarial attacks involve some method of reducing the dimension of the perturbation, such as finding a perturbation in a smaller space and upsampling to match the size of the original image.

The system may use a simple upsampling technique. Instead of optimizing over $\mathbb{R}^{3\times\ell\times\ell}$, the system may optimize a small tile with side length $\ell_0$, where $\ell_0 \ll \ell$, so that the tile is in $\mathbb{R}^{3\times\ell_0\times\ell_0}$, and then expand the tile to the dimension of the image of dimension $3\times\ell\times\ell$ to which it will be added. This expansion is done by repeating the tile along its height and width until it is of the same size as the original image.

The result may include a perturbation that can be used on a large image, but the space of these perturbations may be significantly reduced (from $\mathbb{R}^{3\times\ell\times\ell}$ to $\mathbb{R}^{3\times\ell_0\times\ell_0}$). The system may be able to choose the tile size $\ell_0$; as this value increases, the search space of possible images increases (and therefore the chance that it includes an effective perturbation also increases), at the cost of increasing the dimension of the optimization problem. A good value for this will vary greatly depending on the classification task and the size of the original image, $\ell$, but as an example, with the ImageNet dataset, where image size $\ell$ is 224, the system may find a tile size $\ell_0$ between 4 and 22 to be effective.

In essence, this disclosure may include an algorithm for solving the optimization problem presented above. The algorithm is presented at a high level, where Opt is a generic black-box optimizer with internal parameters $\theta$ and Tile is the tiling operation described in the previous subsection. The system may assume that there is access to a labeled dataset $\{x_i, y_i\}_{i=1}^{N}$. The system may loop through this dataset, and for each image, generate a perturbation tile, tile it to be of the same size as the image, add it to the image, and query the network with this perturbed input. After a particular number J of queries, the system may update the perturbation $\delta^*$. This process of updating the perturbation may continue until the system may reach a set number of maximum iterations T, at which point the system may output and return $\delta^*$.

At step 301, the system may initialize the optimizer. The system may be utilizing optimization parameters $\theta_0$ and perturbation $\delta^*$. The system may initialize the optimizer with a first query and a first iteration. Next at step 303, the system may run the optimizer with the given parameters $\theta$ for that set of data. Thus, each iteration that is run by the optimizer may utilize different parameters $\theta$. At step 305, the system may generate a perturbation tile $\tilde{z}_j$ from the optimizer given the specific parameters $\theta$ and based on the iteration or query. Thus, the perturbation tile $\tilde{z}_j$ may be associated with a given parameter of the input data.

Next, the system may apply the perturbation tile to a labeled dataset to create a perturbed image $(x_{ij+1}+z_j)$ at step 311. Thus, the perturbed image may be specified and associated with the perturbation tile and image from the labeled data set. The image may be any type of image, including a photo, video, or sound recording. At step 313, the perturbed image may be fed into the classifier C. The classifier C may be utilized to determine if it can classify the perturbed image. Given the perturbations, the classifier C may have difficulty in determining a correct classification, thus a loss must be analyzed with respect to the classifier and the perturbed image. At step 315, the classifier may predict the classification of the perturbed image. The classifier may then determine if it has correctly classified the perturbed image, and if it is wrong, compute the loss function at step 317. As such, a loss function value $L_j$ may be determined to associated a score with the classification loss for the perturbed image. At the conclusion of determining the loss function value $L_j$, the system may have completed a single iteration. As such, the system may continue to optimize with new parameters until a threshold has been reached for iterations or queries, or a certain loss value has been met (e.g., a threshold associated with the loss value). Thus, at decision 319, the system may determine if the queries per iteration was reached, or if j=J. If queries per iteration threshold was not reached, the system may repeat steps 303-317 until the threshold is reached.

If the queries per iteration threshold was reached at decision 319, the system may output the best perturbation tile at step 323. Thus, the system may update the optimizer parameters and utilize the candidate perturbation tiles. The best or optimal perturbation tile may be such a tile that maximizes the expected loss over all images in the model's input distribution as defined in the equation $\delta^*:=\mathrm{argmax}_{\|\delta\|\le\epsilon}$ $E_{x,y\sim\mathcal{P}(\mathcal{X})}[L(x+\delta, y)]$ At decision 325, the system may determine if the optimizer has reached an iteration threshold has been reached. If the threshold has not been reached, the system may continue to optimize with a new set of parameters to the input as shown in step 321. If the threshold has been reached or surpassed, the system may then perform tiling on the best perturbation and output the best perturbation as shown in step 329.

At a high-level, the process of the system may be explained as the following:

Initialize perturbation tile $\tilde{\delta}^*_0:=0\in\mathbb{R}^{3\times\ell_0\times\ell_0}$ and optimization parameter $\theta_0$
For i=0, ..., T−1:
  For j=1, ... J:
    $\tilde{z}_j\leftarrow$ Perturbation tile generated from optimization parameters $\theta_t$
    $z_j\leftarrow\mathrm{tile}(\tilde{z}_j)$
    $L_j\leftarrow L(x_{tj+j}+z_j, y_{tj+j})$
  $\delta_{t+1}^*,\theta_{t+1}\leftarrow$ Update tile and optimizer params using $\theta_t$ and $(\tilde{z}_1, L_1), \ldots, (\tilde{z}_j, L_j)$
Return Tile($\delta_T^*$)

The algorithm may include a set number of iterations T; however, the system may be free to stop the process whenever it has found a satisfactory perturbation, or when the system has reached some particular threshold or condition. For example, a threshold may be utilized to define an end to the perturbation process. As presented, the algorithm may perturb each image and queries it exactly once, but if desirable the system could query each image more than once. As described with respect to the optimizers, a wide range of optimizers could be used to sample perturbation tiles and estimate the best perturbation. The tiling form of upsampling may be optimal for the system, but any upsampling technique may be used, or none at all. For example, if the original image dimension is small enough, no dimension reduction may be necessary.

Figure 4A:
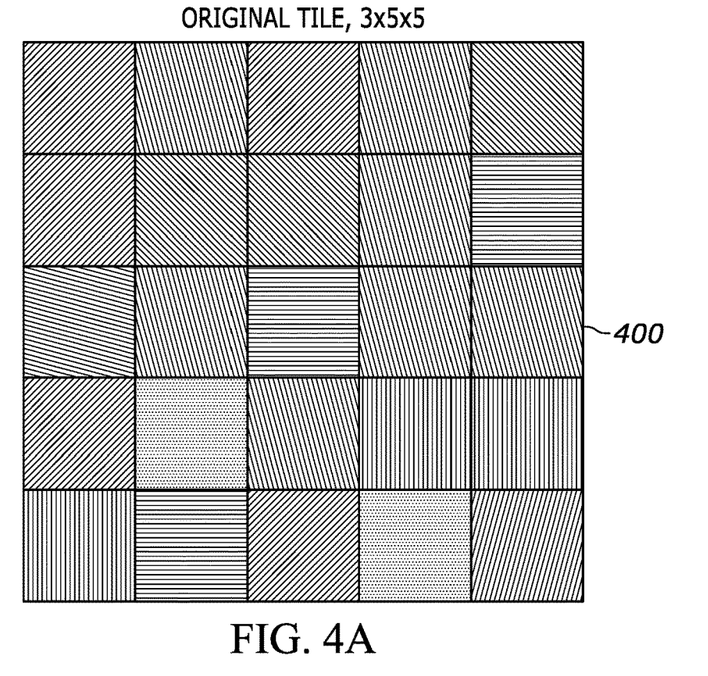
FIG. 4A illustrates an example of an original tile taken from an image.
Figure 4B:
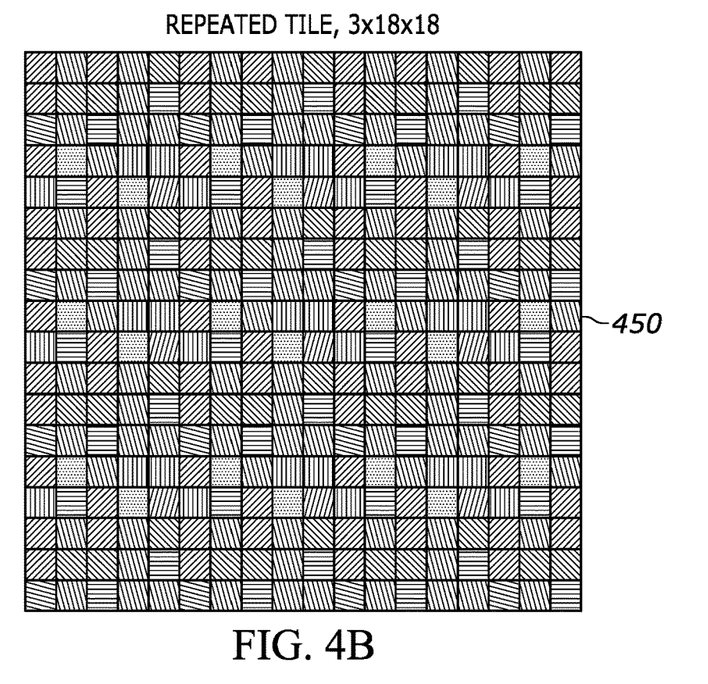
FIG. 4B illustrates a repeated tile as utilizing the original tile in FIG. 4A.

FIG. 4A illustrates an example of an original tile taken from an image. FIG. 4B illustrates a repeated tile as utilizing the original tile in FIG. 4A. The original tile 400 shown in FIG. 4A may be a dimension of 3×5×5, in one example. As such, the original tile 400 with a size 3×5×5 ($\ell_0$=5) may be repeated along its height and width to upsample it to a larger image. Thus, FIG. 4B may illustrate a larger, tiled image 450 with size 3×18×18 ($\ell$=18).

The system may use a simple upsampling technique to be applied to the original tile 400. Instead of optimizing over $\mathbb{R}^{3\times\ell\times\ell}$, the system may optimize a small tile with side length $\ell_0$, where $\ell_0\ll\ell$, so that the tile is in $\mathbb{R}^{3\times\ell_0\times\ell_0}$, and then expand the tile to the dimension of the image of dimension $3\times\ell\times\ell$ to which it will be added. This expansion may be done by repeating the tile along its height and width until it is of the same size as the original image.

Figure 5:
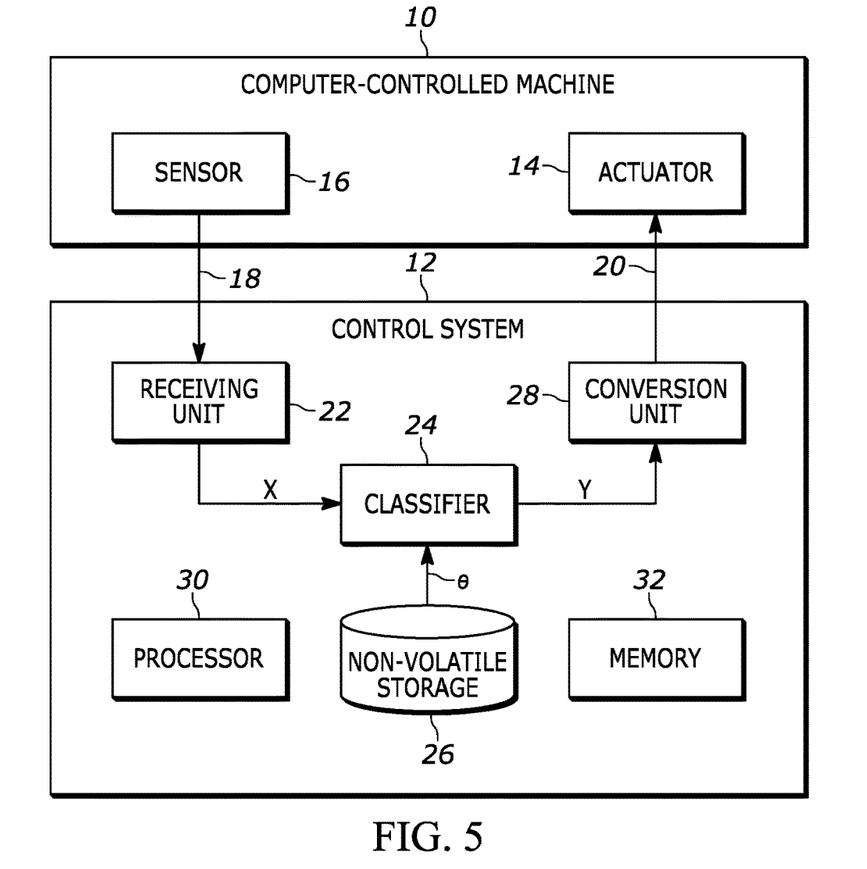
FIG. 5 depicts a schematic diagram of an interaction between computer-controlled machine 10 and control system 12.

FIG. 5 depicts a schematic diagram of an interaction between computer-controlled machine 10 and control system 12. The computer-controlled machine 10 may include a neural network as described in FIGS. 1-3. The computer-controlled machine 10 includes actuator 14 and sensor 16. Actuator 14 may include one or more actuators and sensor 16 may include one or more sensors. Sensor 16 is configured to sense a condition of computer-controlled machine 10. Sensor 16 may be configured to encode the sensed condition into sensor signals 18 and to transmit sensor signals 18 to control system 12. Non-limiting examples of sensor 16 include video, radar, LiDAR, ultrasonic and motion sensors. In one embodiment, sensor 16 is an optical sensor configured to sense optical images of an environment proximate to computer-controlled machine 10.

Control system 12 is configured to receive sensor signals 18 from computer-controlled machine 10. As set forth below, control system 12 may be further configured to compute actuator control commands 20 depending on the sensor signals and to transmit actuator control commands 20 to actuator 14 of computer-controlled machine 10.

As shown in FIG. 5, control system 12 includes receiving unit 22. Receiving unit 22 may be configured to receive sensor signals 18 from sensor 16 and to transform sensor signals 18 into input signals x. In an alternative embodiment, sensor signals 18 are received directly as input signals x without receiving unit 22. Each input signal x may be a portion of each sensor signal 18. Receiving unit 22 may be configured to process each sensor signal 18 to product each input signal x. Input signal x may include data corresponding to an image recorded by sensor 16.

Control system 12 includes classifier 24. Classifier 24 may be configured to classify input signals x into one or more labels using a machine learning (ML) algorithm, such as a neural network described above. Classifier 24 is configured to be parametrized by parameters, such as those described above (e.g., parameter θ). Parameters θ may be stored in and provided by non-volatile storage 26. Classifier 24 is configured to determine output signals y from input signals x. Each output signal y includes information that assigns one or more labels to each input signal x. Classifier 24 may transmit output signals y to conversion unit 28. Conversion unit 28 is configured to covert output signals y into actuator control commands 20. Control system 12 is configured to transmit actuator control commands 20 to actuator 14, which is configured to actuate computer-controlled machine 10 in response to actuator control commands 20. In another embodiment, actuator 14 is configured to actuate computer-controlled machine 10 based directly on output signals y.

Upon receipt of actuator control commands 20 by actuator 14, actuator 14 is configured to execute an action corresponding to the related actuator control command 20. Actuator 14 may include a control logic configured to transform actuator control commands 20 into a second actuator control command, which is utilized to control actuator 14. In one or more embodiments, actuator control commands 20 may be utilized to control a display instead of or in addition to an actuator.

In another embodiment, control system 12 includes sensor 16 instead of or in addition to computer-controlled machine 10 including sensor 16. Control system 12 may also include actuator 14 instead of or in addition to computer-controlled machine 10 including actuator 14.

As shown in FIG. 5, control system 12 also includes processor 30 and memory 22. Processor 30 may include one or more processors. Memory 22 may include one or more memory devices. The classifier 24 (e.g., ML algorithms) of one or more embodiments may be implemented by control system 12, which includes non-volatile storage 26, processor 30 and memory 22.

Non-volatile storage 26 may include one or more persistent data storage devices such as a hard drive, optical drive, tape drive, non-volatile solid-state device, cloud storage or any other device capable of persistently storing information. Processor 30 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 22. Memory 22 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 30 may be configured to read into memory 22 and execute computer-executable instructions residing in non-volatile storage 26 and embodying one or more ML algorithms and/or methodologies of one or more embodiments. Non-volatile storage 26 may include one or more operating systems and applications. Non-volatile storage 26 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 30, the computer-executable instructions of non-volatile storage 26 may cause control system 12 to implement one or more of the ML algorithms and/or methodologies as disclosed herein. Non-volatile storage 26 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
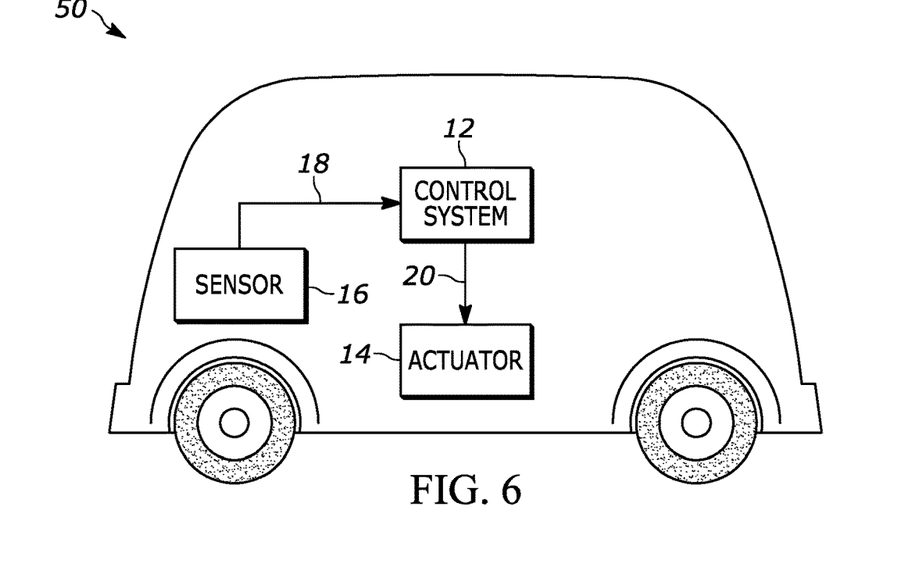
FIG. 6 depicts a schematic diagram of the control system of FIG. 1 configured to control a vehicle, which may be a partially autonomous vehicle or a partially autonomous robot.

FIG. 6 depicts a schematic diagram of control system 12 configured to control vehicle 50, which may be an at least partially autonomous vehicle or an at least partially autonomous robot. As shown in FIG. 5, vehicle 50 includes actuator 14 and sensor 16. Sensor 16 may include one or more video sensors, radar sensors, ultrasonic sensors, LiDAR sensors, and/or position sensors (e.g. GPS). One or more of the one or more specific sensors may be integrated into vehicle 50. Alternatively or in addition to one or more specific sensors identified above, sensor 16 may include a software module configured to, upon execution, determine a state of actuator 14. One non-limiting example of a software module includes a weather information software module configured to determine a present or future state of the weather proximate vehicle 50 or other location.

Classifier 24 of control system 12 of vehicle 50 may be configured to detect objects in the vicinity of vehicle 50 dependent on input signals x. In one example, an adversarial perturbation may be found associated with input data related to images of a vehicle to help a classifier 24 identify the vehicle in non-optimal conditions or during adversarial attacks. In such an embodiment, output signal y may include information characterizing the vicinity of objects to vehicle 50. Actuator control command 20 may be determined in accordance with this information. The actuator control command 20 may be used to avoid collisions with the detected objects.

In embodiments where vehicle 50 is an at least partially autonomous vehicle, actuator 14 may be embodied in a brake, a propulsion system, an engine, a drivetrain, or a steering of vehicle 50. Actuator control commands 20 may be determined such that actuator 14 is controlled such that vehicle 50 avoids collisions with detected objects. Detected objects may also be classified according to what classifier 24 deems them most likely to be, such as pedestrians or trees. The actuator control commands 20 may be determined depending on the classification. In a scenario where an adversarial attack may occur, the system described above may be further trained to better detect objects or identify a change in lighting conditions or an angle for a sensor or camera on vehicle 50.

In other embodiments where vehicle 50 is an at least partially autonomous robot, vehicle 50 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 20 may be determined such that a propulsion unit, steering unit and/or brake unit of the mobile robot may be controlled such that the mobile robot may avoid collisions with identified objects.

In another embodiment, vehicle 50 is an at least partially autonomous robot in the form of a gardening robot. In such embodiment, vehicle 50 may use an optical sensor as sensor 16 to determine a state of plants in an environment proximate vehicle 50. Actuator 14 may be a nozzle configured to spray chemicals. Depending on an identified species and/or an identified state of the plants, actuator control command 20 may be determined to cause actuator 14 to spray the plants with a suitable quantity of suitable chemicals.

Vehicle 50 may be an at least partially autonomous robot in the form of a domestic appliance. Non-limiting examples of domestic appliances include a washing machine, a stove, an oven, a microwave, or a dishwasher. In such a vehicle 50, sensor 16 may be an optical sensor configured to detect a state of an object which is to undergo processing by the household appliance. For example, in the case of the domestic appliance being a washing machine, sensor 16 may detect a state of the laundry inside the washing machine. Actuator control command 20 may be determined based on the detected state of the laundry.

Figure 7:
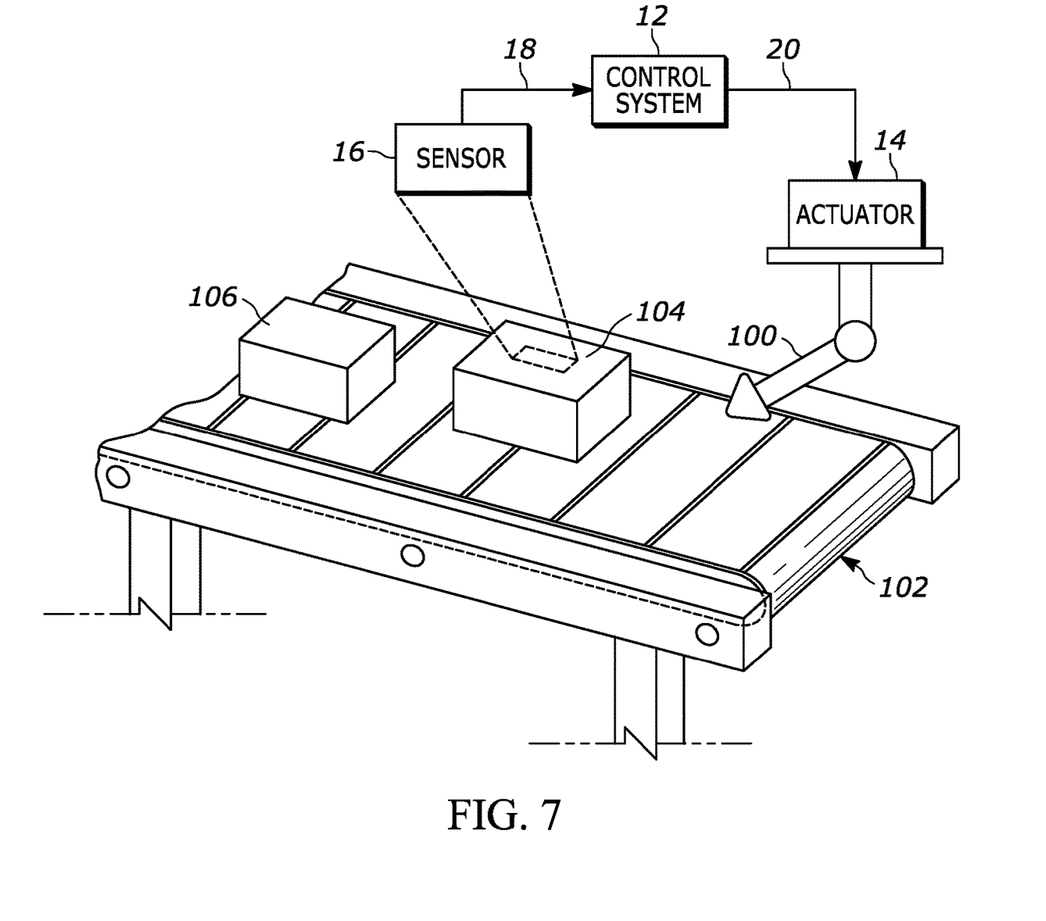
FIG. 7 depicts a schematic diagram of the control system of FIG. 1 configured to control a manufacturing machine, such as a punch cutter, a cutter or a gun drill, of manufacturing system, such as part of a production line.

FIG. 7 depicts a schematic diagram of control system 12 configured to control system 100 (e.g., manufacturing machine), such as a punch cutter, a cutter or a gun drill, of manufacturing system 102, such as part of a production line. Control system 12 may be configured to control actuator 14, which is configured to control system 100 (e.g., manufacturing machine).

Sensor 16 of system 100 (e.g., manufacturing machine) may be an optical sensor configured to capture one or more properties of manufactured product 104. Classifier 24 may be configured to determine a state of manufactured product 104 from one or more of the captured properties. The manufactured product 104 and images associated with the manufactured product may include an adversarial perturbation or added on thereafter to help identify the type of product or state of the manufactured product. Actuator 14 may be configured to control system 100 (e.g., manufacturing machine) depending on the determined state of manufactured product 104 for a subsequent manufacturing step of manufactured product 104. The actuator 14 may be configured to control functions of system 100 (e.g., manufacturing machine) on subsequent manufactured product 106 of system 100 (e.g., manufacturing machine) depending on the determined state of manufactured product 104.

Figure 8:
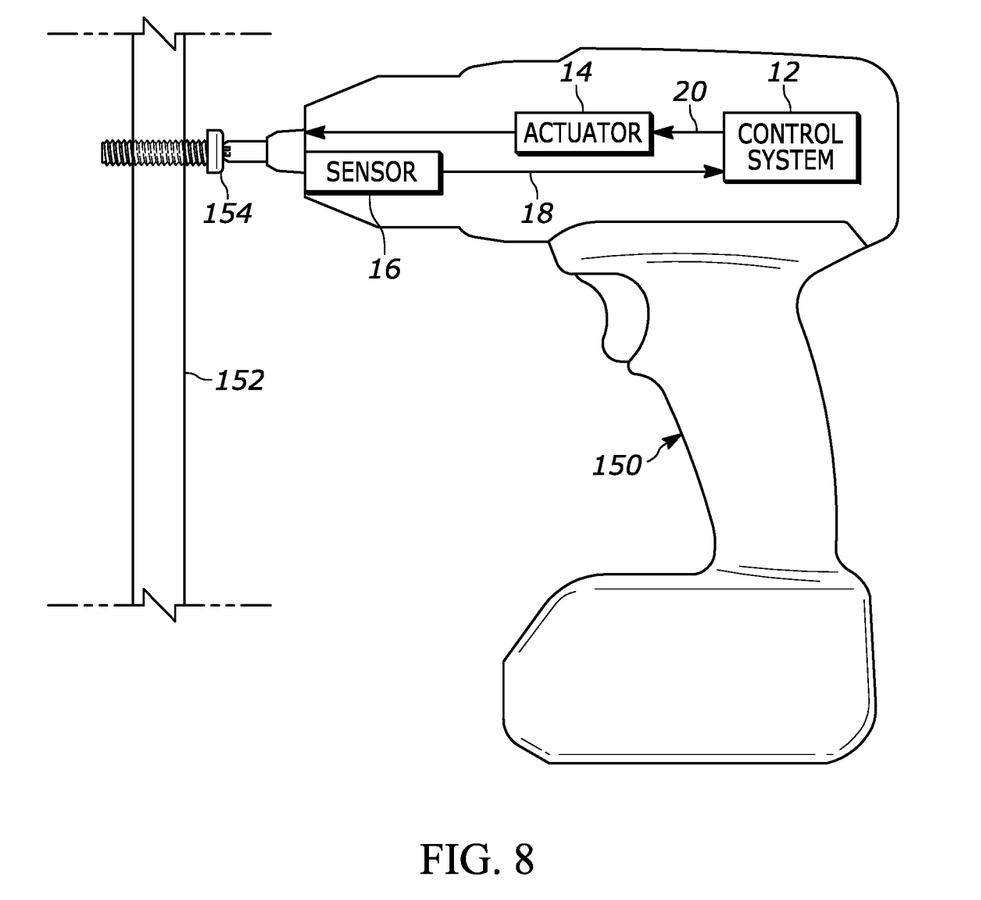
FIG. 8 depicts a schematic diagram of the control system of FIG. 1 configured to control a power tool, such as a power drill or driver, that has an at least partially autonomous mode.

FIG. 8 depicts a schematic diagram of control system 12 configured to control power tool 150, such as a power drill or driver, that has an at least partially autonomous mode. Control system 12 may be configured to control actuator 14, which is configured to control power tool 150.

Sensor 16 of power tool 150 may be an optical sensor configured to capture one or more properties of work surface 152 and/or fastener 154 being driven into work surface 152. Classifier 24 may be configured to determine a state of work surface 152 and/or fastener 154 relative to work surface 152 from one or more of the captured properties. The an adversarial perturbation may help identify a state of the work surface or the type of work surface utilized. The state may be fastener 154 being flush with work surface 152. The state may alternatively be hardness of work surface 152. Actuator 14 may be configured to control power tool 150 such that the driving function of power tool 150 is adjusted depending on the determined state of fastener 154 relative to work surface 152 or one or more captured properties of work surface 152. For example, actuator 14 may discontinue the driving function if the state of fastener 154 is flush relative to work surface 152. As another non-limiting example, actuator 14 may apply additional or less torque depending on the hardness of work surface 152.

Figure 9:
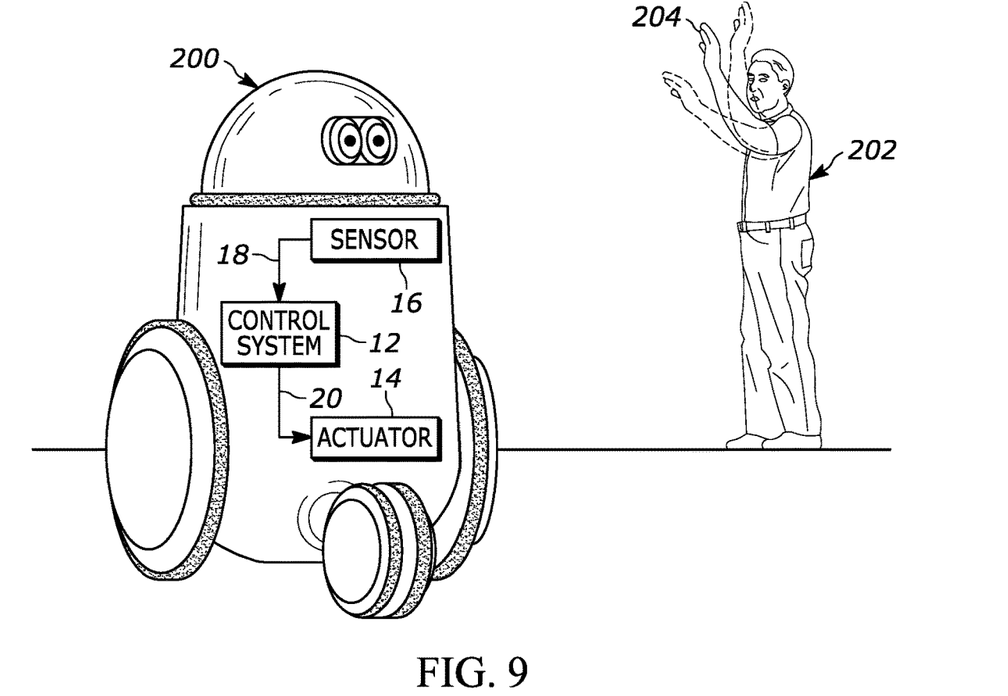
FIG. 9 depicts a schematic diagram of the control system of FIG. 1 configured to control an automated personal assistant.

FIG. 9 depicts a schematic diagram of control system 12 configured to control automated personal assistant 900. Control system 12 may be configured to control actuator 14, which is configured to control automated personal assistant 900. Automated personal assistant 900 may be configured to control a domestic appliance, such as a washing machine, a stove, an oven, a microwave or a dishwasher.

Sensor 16 may be an optical sensor and/or an audio sensor. The optical sensor may be configured to receive video images of gestures 904 of user 902. The audio sensor may be configured to receive a voice command of user 902.

Control system 12 of automated personal assistant 900 may be configured to determine actuator control commands 20 configured to control system 12. Control system 12 may be configured to determine actuator control commands 20 in accordance with sensor signals 18 of sensor 16. Automated personal assistant 900 is configured to transmit sensor signals 18 to control system 12. Classifier 24 of control system 12 may be configured to execute a gesture recognition algorithm to identify gesture 904 made by user 902, to determine actuator control commands 20, and to transmit the actuator control commands 20 to actuator 14. Classifier 24 may be configured to retrieve information from non-volatile storage in response to gesture 904 (or additionally the adversarial perturbations) and to output the retrieved information in a form suitable for reception by user 902.

Figure 10:
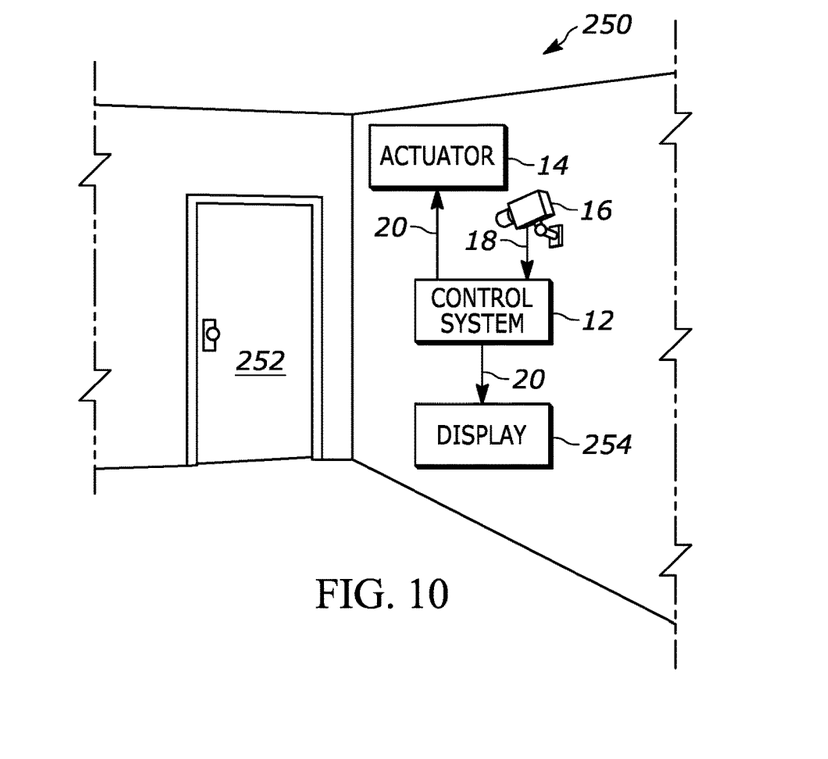
FIG. 10 depicts a schematic diagram of the control system of FIG. 1 configured to control a monitoring system, such as a control access system or a surveillance system.

FIG. 10 depicts a schematic diagram of control system 12 configured to control monitoring system 250. Monitoring system 250 may be configured to physically control access through door 252. Sensor 16 may be configured to detect a scene that is relevant in deciding whether access is granted. Sensor 16 may be an optical sensor configured to generate and transmit image and/or video data. Such data may be used by control system 12 to detect a person's face.

Classifier 24 of control system 12 of monitoring system 250 may be configured to interpret the image and/or video data by matching identities of known people stored in non-volatile storage 26, thereby determining an identity of a person. Classifier 24 may be configured to generate and an actuator control command 20 in response to the interpretation of the image and/or video data. Control system 12 is configured to transmit the actuator control command 20 to actuator 14. In this embodiment, actuator 14 may be configured to lock or unlock door 252 in response to the actuator control command 20. In other embodiments, a non-physical, logical access control is also possible.

Monitoring system 250 may also be a surveillance system. In such an embodiment, sensor 16 may be an optical sensor configured to detect a scene that is under surveillance and control system 12 is configured to control display 254. Classifier 24 is configured to determine a classification of a scene, e.g. whether the scene detected by sensor 16 is suspicious. The system's classifier may be trained to be utilized for detecting certain types of objects to allow the system to identify such objects in non-optimal conditions (e.g., night, fog, rainy, etc.) or adversarial attacks. Control system 12 is configured to transmit an actuator control command 20 to display 254 in response to the classification. Display 254 may be configured to adjust the displayed content in response to the actuator control command 20. For instance, display 254 may highlight an object that is deemed suspicious by classifier 24.

Figure 11:
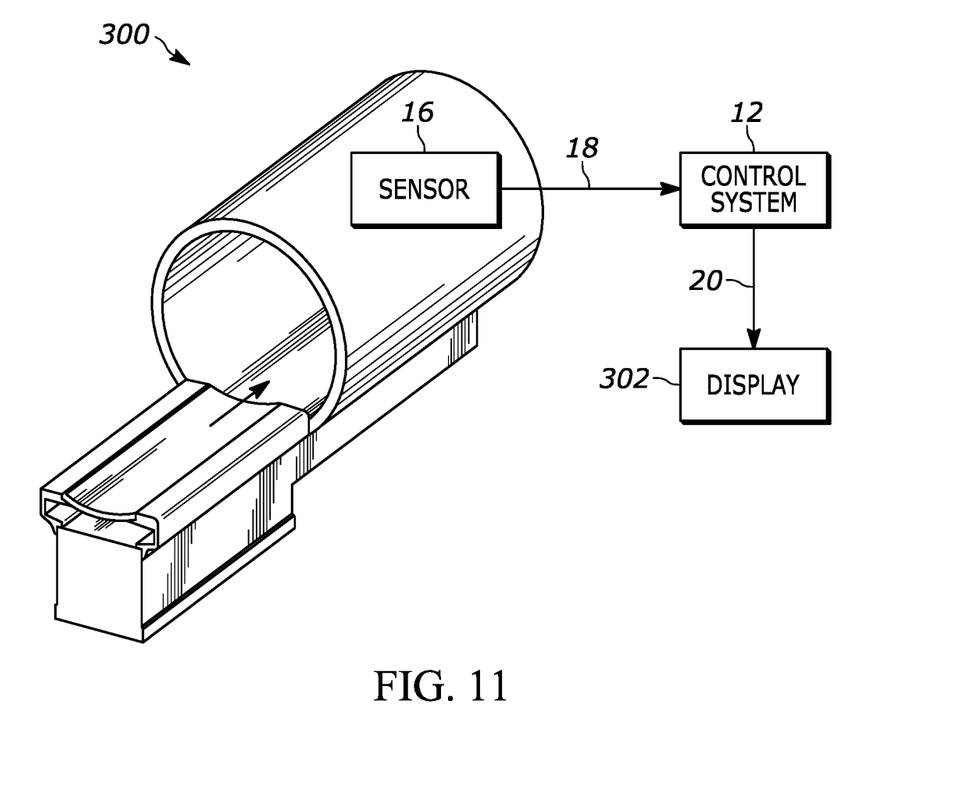
FIG. 11 depicts a schematic diagram of the control system of FIG. 1 configured to control an imaging system, for example an MRI apparatus, x-ray imaging apparatus or ultrasonic apparatus.

FIG. 11 depicts a schematic diagram of control system 12 configured to control imaging system 1100, for example an MRI apparatus, x-ray imaging apparatus or ultrasonic apparatus. Sensor 16 may, for example, be an imaging sensor. Classifier 24 may be configured to determine a classification of all or part of the sensed image. Classifier 24 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for training a machine-learning network, comprising: receiving an input data from a sensor, wherein the input data includes data indicative of an image, wherein the sensor includes a video, radar, LiDAR, sound, sonar, ultrasonic, motion, or thermal imaging sensor;
generating an adversarial version of the input data utilizing an optimizer, wherein the adversarial version of the input data utilizes a subset of the input data, parameters associated with the optimizer, and one or more perturbation tiles; determining loss function value utilizing the adversarial version of the input data and a classification of the adversarial version of the input data;
determining a perturbation tile utilizing the loss function value associated with one or more subsets of the adversarial version of the input data, wherein the perturbation tiles are generated via repeating a perturbation; and output a final perturbation that includes at least the perturbation tile in response to at least meeting or exceeding a threshold.

2. The computer-implemented method of claim 1, wherein the method includes updating the perturbation tile in response to a set number of queries being met.

3. The computer-implemented method of claim 1, wherein the method includes creating a second training data set utilizing updated parameters; and
determining a second classification loss value when queries per iteration has not been reached.

4. The computer-implemented method of claim 1, wherein the perturbation tile is a same size of pixels as the image.

5. The computer-implemented method of claim 1, wherein the perturbation tile is a smaller size of pixels than the image.

6. The computer-implemented method of claim 1, wherein the perturbation tile is generated via the optimizer utilizing the parameters associated with the optimizer.

7. The computer-implemented method of claim 1, wherein the method includes outputting a trained machine-learning network upon convergence to a first threshold.

8. The computer-implemented method of claim 1, wherein the method includes updating the perturbation tile and parameters based on a classification of the adversarial version of the input data.

9. The computer-implemented method of claim 1, wherein the method includes determining if an iteration threshold has been met, and in response to the iteration threshold being met, output the perturbation as associated with the loss function value.

10. A system including a machine-learning network, comprising:
- an input interface configured to receive input data from a sensor, wherein the sensor includes a video, radar, LiDAR, sound, sonar, ultrasonic, motion, or thermal imaging sensor;
- a processor, in communication with the input interface, wherein the processor is programmed to:
- receive an input data from a sensor, wherein the input data includes one or more images;
- generate a first adversarial version of a first subset of images from the input data utilizing an optimizer, wherein the first adversarial version of the first subset utilizes parameters associated with the optimizer, and one or more perturbation tiles;
- determine a loss function value utilizing the first adversarial version of the first subset and a first classification of the first adversarial version of the first subset;
- determine a first perturbation tile utilizing the loss function value associated with of the first adversarial version of the first subset;
- output a perturbation that includes at least the first perturbation tile;
- generate a second adversarial version of a second subset of images from the input data utilizing an optimizer and the perturbation;
- determine the loss function value utilizing the second adversarial version of the second subset and a second classification of the second adversarial version of the second subset;
- determine a second perturbation tile utilizing the loss function value associated with the second adversarial version of the second subset; and
- output a final perturbation in response to at least meeting or exceeding a threshold, wherein the first perturbation tile and the second perturbation tile are generated via repeating a perturbation.

11. The system of claim 10, wherein the processor is further programmed to repeat generating the perturbation tile with new parameters until an iteration threshold is met or exceeded.

12. The system of claim 10, wherein the processor is further programmed to update the perturbation tile and parameters utilizing a classification tile of the adversarial version of the input data.

13. The system of claim 10, wherein the processor is further programmed to output the perturbation in response to reaching an iteration threshold.

14. The system of claim 10, wherein the processor is further programmed to utilize updated parameters with the optimizer in response to falling below an iteration threshold.

15. The system of claim 10, wherein the processor is further programmed to apply a reduction technique to the perturbation tile.

16. A computer-program product storing instructions which, when executed by a computer, cause the computer to:
- receive an input data from a sensor, wherein the input data includes data indicative of image, wherein the sensor includes a video, radar, LiDAR, sound, sonar, ultrasonic, motion, or thermal imaging sensor;
- generate a first adversarial version of a first subset of images from the input data utilizing an optimizer, wherein the first adversarial version of the first subset utilizes parameters associated with the optimizer, and one or more perturbation tiles;
- determine a loss function value utilizing the first adversarial version of the first subset and a first classification of the first adversarial version of the first subset;
- determine a first perturbation tile utilizing the loss function value associated with of the first adversarial version of the first subset;
- output a perturbation that includes at least the first perturbation tile;
- generate a second adversarial version of a second subset of images from the input data utilizing an optimizer and the perturbation;
- determine the loss function value utilizing the second adversarial version of the second subset and a second classification of the second adversarial version of the second subset;
- determine a second perturbation tile utilizing the loss function value associated with the second adversarial version of the second subset; and
- output a final perturbation in response to at least meeting or exceeding a threshold, wherein the first perturbation tile and the second perturbation tile are generated via repeating a perturbation.

17. The computer-program product of claim 16, wherein the threshold is associated with iterations of determining the loss function value associated with a plurality of adversarial versions of the subset.

18. The computer-program product of claim 16, wherein instructions cause the computer to apply a reduction technique to the image in generating the first perturbation tile.

19. The computer-program product of claim 16, wherein the first perturbation tile is generated via the optimizer utilizing the parameters associated with the optimizer.

20. The computer-program product of claim 16, wherein the first perturbation tile is a smaller size of pixels than the image.

* * * * *